//patents.google.com/patent/US3024271

United States Patent Office 3,024,271
Patented Mar. 6, 1962

3,024,271
3,11,17 - TRIOXYGENATED - 18 - NOR - D - HOMO-13α-STEROIDS AND PROCESSES FOR THEIR PREPARATION
Gaston Amiard, Noisy-le-Sec, Jacques Martel, Bondy, René Heymés, Romainville, and Léon Velluz, Paris, France, assignors to Les Laboratoires Francais de Chimiotherapie, Paris, France, a corporation of France
No Drawing. Filed July 20, 1959, Ser. No. 828,031
Claims priority, application France Aug. 8, 1958
14 Claims. (Cl. 260—476)

This invention relates to a group of 3,11,17-trioxygenated-18-nor-D-homo-13α-steroids of the general formula

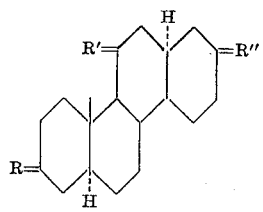

wherein R, R' and R" represent oxygen or

the secondary alcohol functional group in the 3- and 17-positions being either free or esterified, intermediates in the production of these steroids and process for the production of these steroids.

It is an object of the present invention to produce new 3,11,17-trioxygenated-18-nor-D-homo-13α-steroids.

It is a further object to produce 18-nor-D-homo-13-α-androstanes having either a keto or a secondary alcohol functional group on the 3,11 and 17 positions of the molecule.

It is a still further object to produce intermediate compounds useful in the production of 3,11,17-trioxygenated-18-nor-D-homo-13α-steroids such as the 18-nor-D-homo-Δ$^{13(17a)}$-androstenes, the 18-nor-D-homo-Δ$^{12,17a}$-androstadienes, the 18-nor-D-homo-Δ$^{11,13(17a)}$-androstadienes, the 18-nor-D-homo-Δ$^{9(11),12,17a}$-androstatrienes, the 18-nor-D-homo-Δ$^{9(11),12}$-androstadienes, the 18-nor-D-homo-Δ$^{9(11)}$-13α-androstenes, all having either a keto or a secondary alcohol functional group on the 3 and 17 positions of the molecule; and the 9α-bromo-18-nor-D-homo-13α-androstanes having either a keto or a secondary alcohol functional group on the 3,11 and 17 positions of the molecule.

It is another object of our invention to develop a process for the production of novel 3,11,17-trioxygenated-18-nor-D-homo-13α-steroids from the known 3β-hydroxy-18-nor-D-homo-Δ$^{13(17a)}$-androstene-17-one.

These and other objects of the invention will become apparent as the description proceeds.

We have found and have prepared new 3,11,17-trioxygenated-18-nor-D-homo-13α-androstanes having the general structural formula

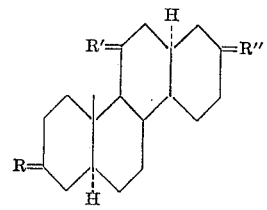 (A)

wherein R' represents =O or

groups, R" represents =O or

where X represents hydrogen or an acyl group such as the lower alkanoyl group or the benzoyl group and R represents =O or

where Y represents hydrogen or an acyl group which is difficult to saponify such as benzoyl, naphthoyl, hexahydrobenzoyl and cyclopentylpropionyl groups or the lower alkanoyl group.

These compounds are useful as intermediates and have interesting physiological properties. Aldosterone can be prepared from 3β-benzoxy-11,17-diketo-18-nor-D-homo-13α-androstane (Compound XVII) according to the following schematic diagram utilizing reactions well known in steroid chemistry.

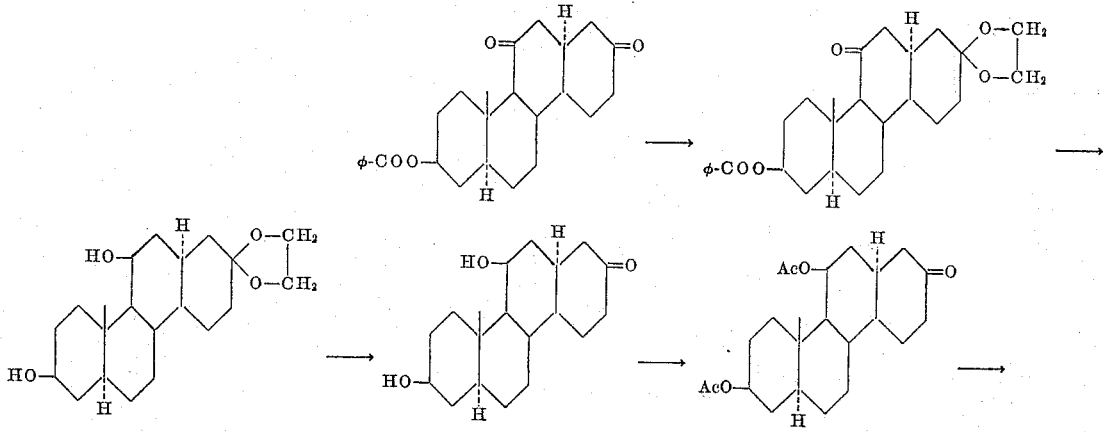

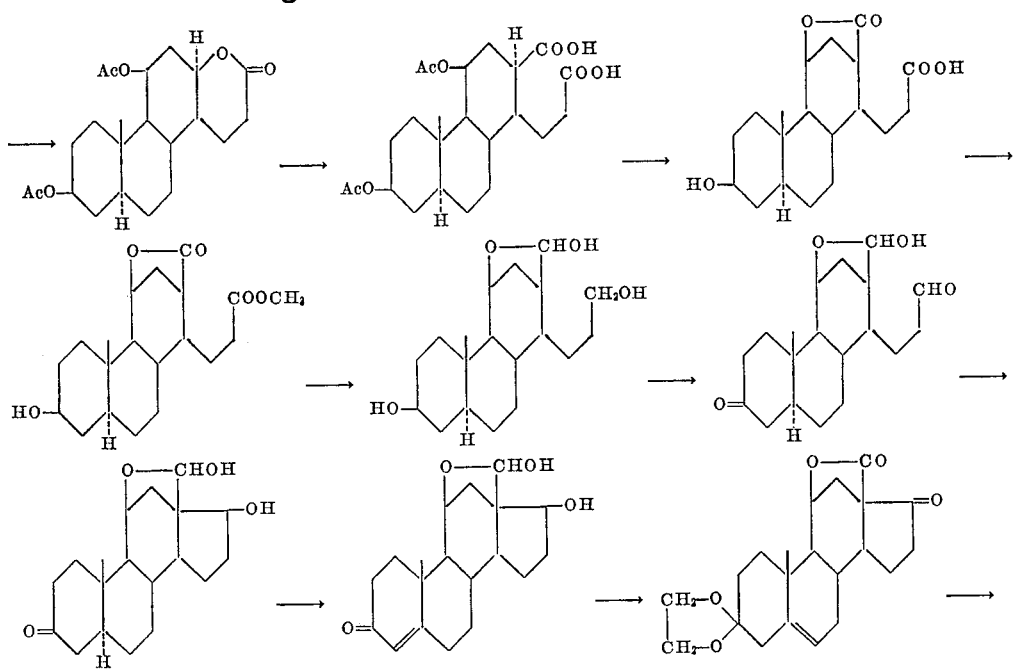
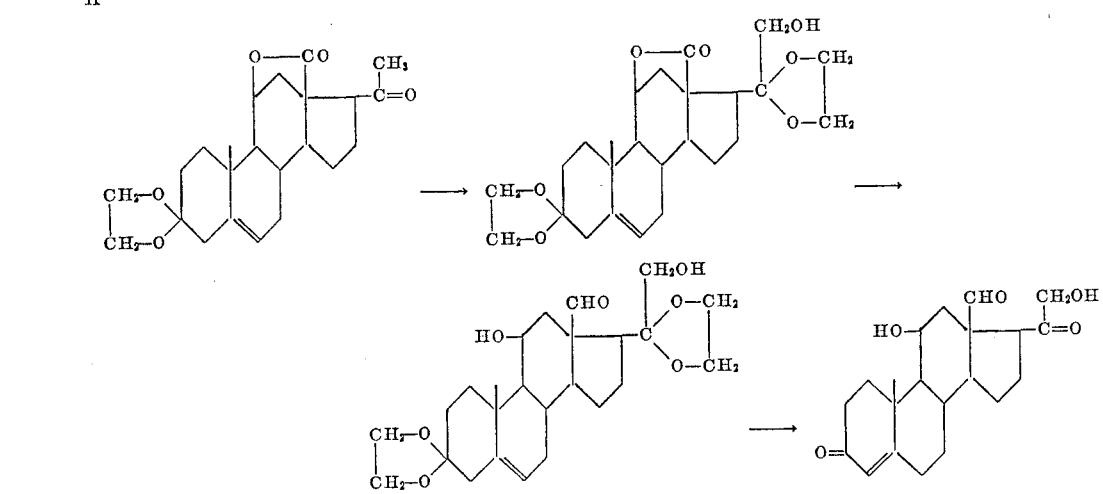
In accordance with the present invention, these compounds are prepared, starting with 3β-hydroxy-18-nor-D-homo-$\Delta^{13(17a)}$-androstene-17-one (I), which is described in the literature, by the series of reactions described below and by passing through the intermediates shown in the schematic flow diagram following.
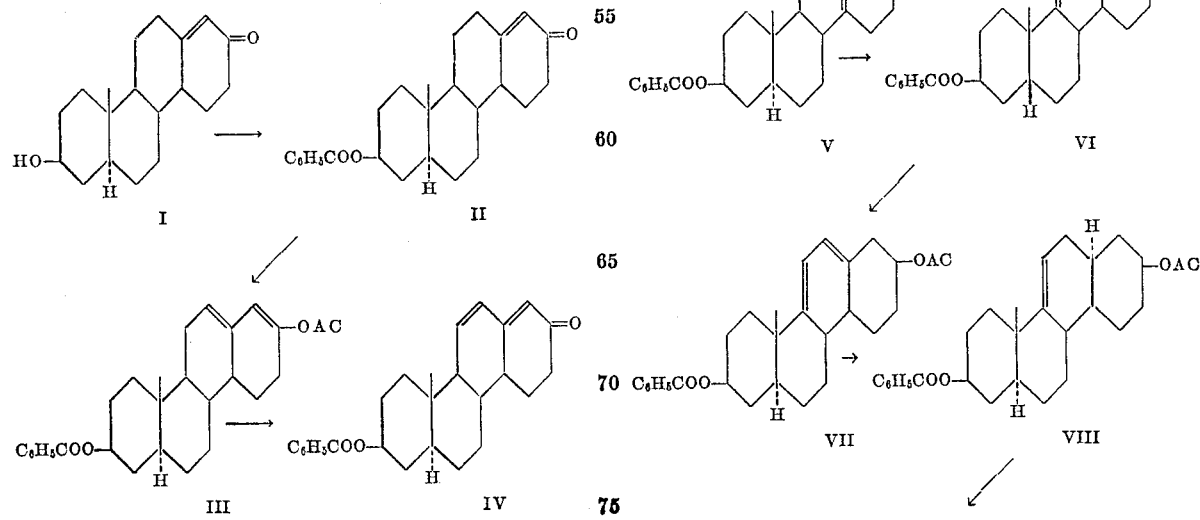

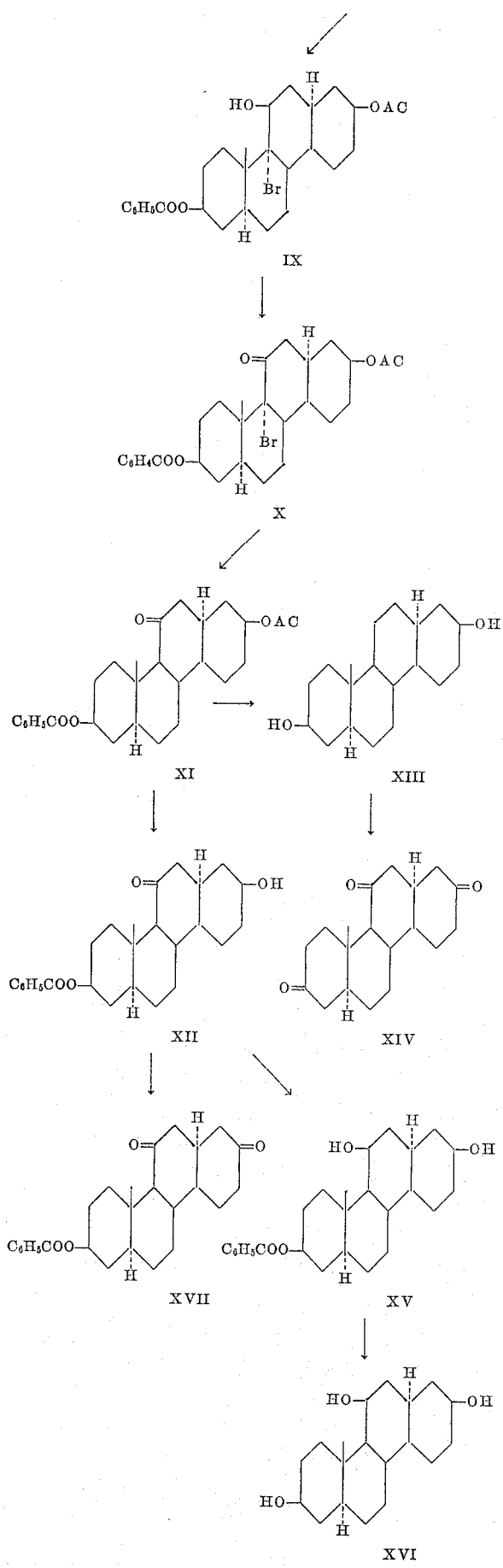

The hydroxy-ketone (I) is esterified with an acid giving an ester which is difficult to saponify, such as benzoic acid, and then enolized by reacting the 3β-acyloxy-18-nor-D-homo-$\Delta^{13(17a)}$-androstene-17-one (II) with an acylating mixture to give an enol ester, this acylating mixture being preferably acetyl chloride and acetic anhydride, in the presence of a tertiary base, such as pyridine. 3β,17-diacyloxy-18-nor-D-homo-$\Delta^{12,17a}$-androstadiene (III) is thus obtained. Migration of the double bonds from the 12 to the 11 and from the 17a to the 13 positions are caused by bromination in the presence of a tertiary base such as collidine, followed by de-hydrobromination with a mixture of lithium carbonate and lithium bromide. This process is described in French Patent No. 1,179,940. At the same time the alkalinity of the dehydrobromination reaction medium regenerates the ketone function in the 17-position. 3β-acyloxy-18-nor-D-homo-$\Delta^{11,13(17a)}$-androstadiene-17-one (IV) is obtained. This compound is likewise subjected to an enolizing treatment. In this manner 3β-17-diacyloxy-18-nor-D-homo-$\Delta^{9(11),12,17a(17)}$-androstatriene (V) is obtained. By reducing this enol ester with a boron hydride of an alkali metal, preferably in a medium of tetrahydrofuran and water and in the presence of a lower alcohol, the double bond of the D ring is selectively reduced, while at the same time the alkalinity of the reaction medium saponifies the acyloxy radical in the 17-position. 3β-acyloxy-17β-hydroxy-18-nor-D-homo-$\Delta^{9(11),12}$-androstadiene (VI) is thus obtained, which compound is again acylated into 3β,17β-diacyloxy-18-nor-D-homo-$\Delta^{9(11),12}$-androstadiene (VII). Catalytic hydrogenation at room temperature and atmospheric pressure, preferably in the presence of palladium leads selectively to the saturation of the double bond in the 12,13-position, yielding 3β,17β-diacyloxy-18-nor-D-homo-$\Delta^{9(11)}$-13α-androstene (VIII). This compound is then treated with N-bromo succinimide, preferably in the presence of perchloric acid, to produce the bromohydrin (IX), i.e. 3β,17β-diacyloxy-11β-hydroxy-9α-bromo-18-nor-D-homo-13α-androstane. By oxidizing this compound, for example, with a mixture of chromic and acetic acid or with N-bromosuccinimide, N-bromoacetamide or N-bromohydantoin, 3β,17β-diacyloxy-11-keto-9α-bromo-18-nor-D-homo-13α-androstane (X) is obtained, which yields, upon debromination with zinc in acetic acid, 3β,17β-diacyloxy-11-keto-18-nor-D-homo-13α-androstane (XI). By acid alcoholysis, preferably with methanol, the Compound XI is transformed into 3β-acyloxy-17β-hydroxy-11-keto-18-nor-D-homo-13α-androstane (XII). Moreover, Compound XI can be saponified in the presence of glycol with an alkaline agent, such as sodium methylate, into 3β,17β-dihydroxy-11-keto-18-nor-D-homo-13α-androstane (XIII). Simultaneous oxidation of the two alcohol groups in the 13- and 17-positions by customary methods in the steroid art, particularly with a mixture of chromic and acetic acid, yields 3,11,17-triketo-18-nor-D-homo-13α-androstane (XIV).

Additionally, oxidation of 3β-acyloxy-17β-hydroxy-11-keto-18-nor-D-homo-13α-androstane (XII) yields 3β-acyloxy-11,17-diketo-18-nor-D-homo-13α-androstane (XVII), and by reduction of XII with alkali metal boron hydrides compound XV is obtained, which upon saponification yields 3β,11β,17β-trihydroxy-18-nor-D-homo-13α-androstane (XVI).

The following examples are designed to illustrate the invention and are not limitations on the invention. The melting points are instantaneous melting points determined on a Maquenne block.

EXAMPLE I

*Preparation of 3β,17β-Dihydroxy-11-Keto-18-Nor-D-Homo-13α-Androstane (XIII) and Its Esters*

(a) *Preparation of 3β-benzoxy-18-nor-D-homo-$\Delta^{13(17a)}$-androstene-17-one (II).*—1 gm. of 3β-hydroxy-18-nor-D-homo-$\Delta^{13(17a)}$-androstene-17-one (I), prepared according to Miescher et al., Helv. Chim. Acta, 32, page 761 (1949), was dissolved in 5 cc. of pyridine; 3 cc. of benzoyl chloride were added, the mixture was allowed to stand at room temperature for two hours, poured into water and extracted with benzene. The benzene phase was washed successively with water, sodium bicarbonate, water, 1 N hydrochloric acid, sodium bicarbonate and water. It was then dried over magnesium sulfate, filtered and evaporated to dryness. The residue, consisting of raw compound II, was recrystallized twice from ethyl acetate. 1.1 gm., that is a yield of 81%, of colorless needles having a melting point of 234° C. and a specific rotation $[\alpha] = -30° \pm 2$ (c.=2% in chloroform) were obtained. The ultraviolet spectrum, determined in ethanol, shows:

$$\lambda \max 236 \ m\mu, \ 281 \ m\mu$$
$$\epsilon \ 29,600, \ 895$$

The product is soluble in benzene and chloroform, fairly soluble in acetone, very slightly soluble in alcohol and ether, and insoluble in water.

*Analysis.*—$C_{26}H_{32}O_3$; mol. weight 392.52. Calculated: C, 79.55%; H, 8.22%; O, 12.23%. Found: C, 79.5%; H, 8.2%; O, 12.3.

This compound is not described in the literature.

(b) *Preparation of 3β-benzoxy-17-acetoxy-18-nor-D-homo-$\Delta^{12,17a}$-androstadiene (III).*—5.8 gm. of Compound II having a melting point of 234° C., prepared according to (a) above, were refluxed for 3 hours with 50 cc. of acetic anhydride, 30 cc. of acetyl chloride and 3 cc. of pyridine. The reaction mixture was then evaporated to dryness in a stream of nitrogen. The crystalline residue was washed on a filter with absolute ethanol. After vacuum filtration and drying, 6 gm., that is a yield of 93%, of the enol ester Compound III having a melting point of 182° C. and a specific rotation $[\alpha]_D^{20} = +64° \pm 1$ (c.= 2% in chloroform) were obtained. The ultraviolet spectrum confirmed the presence of a diene linkage in the indicated positions.

$$\lambda \max = 230 \ m\mu$$
$$\epsilon = 30,400 \ (ethanol)$$

The product was obtained in the form of massive prisms which are soluble in 10 volumes of ethyl acetate, insoluble in ether, and insoluble in 30 volumes of ethanol.

*Analysis.*—$C_{28}H_{34}O_4$; molecular weight 434.55. Calculated: C, 77.39%; H, 7.89%. Found: C, 77.2%; H, 7.9%.

This compound is not described in the literature.

(c) *Preparation of 3β - benzoxy - 18 - nor - D - homo-$\Delta^{11,13(17a)}$-androstadiene-17-one (IV).*—28 cc. of glacial acetic acid and 12 cc. of a solution of collidine in glacial acetic acid, prepared by admixing 15 cc. of collidine with 25 cc. of glacial acetic acid, were added in a stream of nitrogen to 4 gm. of Compound III, obtained in accordance with (b) above, while mechanically agitating the mixture. Thereafter, the resulting mixture was heated to 50° C. and 15 cc. of a solution of bromine in glacial acetic acid, prepared from 30 cc. of pure acetic acid and 1 cc. of bromine, were rapidly added thereto dropwise. The reaction mixture should then have been slightly orange in color; if not, a few additional drops of bromine solution were added until the proper color was reached. The reaction mixture was then rapidly poured into a suspension of 250 gm. of sodium bicarbonate, 200 cc. of water and 100 cc. of ether, and ethyl acetate was added to extract the brominated derivative. The organic phase was quickly washed with a saturated aqueous solution of sodium bicarbonate and then with water, dried over anhydrous sodium sulfate and filtered. A mixture of 40 cc. of dimethylformamide, 3 gm. of anhydrous lithium bromide and 3 gm. of dry lithium carbonate was prepared separately, and this mixture was heated to 140–150° C. The solution of the brominated derivative was poured in a thin stream into the hot mixture in a stream of nitrogen and while mechanically agitating and maintaining the temperature at 140° C. The ethyl acetate, the collidine and the ether distilled off, and when the distillation ceased the descending condenser was replaced by an ascending condenser and heating was continued for 1 hour at 150° C. without interrupting either the stream of nitrogen or the agitation. The reaction mixture was then allowed to cool to room temperature and was poured into a mixture of 15 cc. of acetic acid and 200 cc. of water. Raw Compound IV precipitated in a crystalline state. The precipitate was separated by vacuum filtration, washed with water, vacuum filtered, dried and then recrystallized from boiling methylethyl ketone. After cooling, vacuum filtering, and drying, a first yield of Compound IV, amounting to 60% of theory, was obtained. It had a melting point of 223° C. and a specific rotation $[\alpha]_D^{20} = -25° \pm 1$ (c.=1% in chloroform). By concentrating the mother liquor a second yield, amounting to 15% of theory, of Compound IV was obtained. It had a melting point of 218° C. and was easy to purify by recrystallization. The ultraviolet spectrum of Compound IV shows $$\lambda \max = 283 \ m\mu$$
$$\epsilon = 25,900 \ (ethanol)$$

which characterizes the desired diene-one. It is insoluble in alcohol, ether and water.

This compound is not described in the literature.

(d) *Preparation of 3β-benzoxy-17-acetoxy-18-nor-D-homo-$\Delta^{9,(11),12,17a(17)}$-androstatriene (V).*—3 gm. of Compound IV, obtained in accordance with the method described under (c) above, 1.5 cc. of pyridine, 30 cc. of acetic anhydride and 8 cc. of acetyl chloride were heated at about 90° C. in a stream of nitrogen for ¾ hour while stirring the mixture. Upon cooling the reaction mixture to −10° C., Compound V crystallized out. It was vacuum filtered, washed with methanol, again vacuum filtered and dried. 3 gm. of Compound V, that is a yield of 90%, were obtained. It has a melting point of 184° C. and a specific rotation $[\alpha] = +84° \pm 0.5$ (c.=1% in tetrahydrofuran). The ultraviolet spectrum of the compound in ethanol showed:

$$\lambda \max 229 \ m\mu, \ 300 \ m\mu, \ 312 \ m\mu, \ 327 \ m\mu$$
$$\epsilon \ 16,900, \ 17,320, \ 20,000, \ 13,350$$

It was soluble in chloroform, hot acetic acid anhydride and in 15 volumes ethyl acetate, insoluble in ether alcohol and water.

*Analysis.*—$C_{28}H_{32}O_4$; molecular weight 432.54. Calculated: C, 77.75%; H, 7.46%; O, 14.79%. Found: C, 77.7%; H, 7.6%; O, 14.8%.

This compound is not described in the literature.

(e) *Preparation of 3β-benzoxy-17β-hydroxy-18-nor-D-homo-$\Delta^{9(11),12}$-androstadiene (VI) and acetylation of this compound to give 3β-benzoxy-17β-acetoxy-18-nor-D-homo-$\Delta^{9(11),12}$-androstadiene (VII).*—A solution of 1.5 gm. of Compound V, prepared in accordance with (d) above, in 15 cc. of tetrahydrofuran was added slowly over a period of about ¾ hour to a solution of 1.5 gm. of potassium boron hydride in 5 cc. of water and 5 cc. of methanol while stirring and maintaining the temperature during the operation between 40 and 45° C. After all of the solution had been added the agitation was continued for 4 hours at that temperature, the mixture was filtered, the tetrahydrofuran was removed by distillation and the residue was acidified with acetic acid. Compound VI separated out at first as an oily substance but crystallized upon scratching. It was filtered, washed with boiling water, redissolved in acetone and the acetone solution was evaporated to dryness. The residue crystallized upon addition of a few drops of acetone. After drying, 0.67 gm., that is a yield of 50%, of desired Compound VI was obtained. It had a melting point of 175° C. and a specific rotation $[\alpha]_D^{20} = 145° \pm 1$ (c.=1% in tetrahydrofuran). The product was soluble in acetone and alcohol, slightly soluble in ether and insoluble in water.

*Analysis.*—$C_{26}H_{32}O_3$; molecular weight 392.52. Calculated: C, 79.55%; H, 8.22%. Found: C, 79.5%; H, 8.1%.

This compound is not described in the literature.

By acetylation with acetic acid anhydride in the presence of pyridine at elevated temperatures Compound VI formed 3β-benzoxy-17β-acetoxy-18-nor-D-homo-$\Delta^{9(11),12}$-androstadiene (VII). Afer heating it at about 90° C. for 1¼ hours the cooled reaction mixture was poured over ice and extracted with methylene chloride. The organic extract was washed with hydrochloric acid, water, aqueous sodium bicarbonate and again with water. The extract was then dried over anhydrous sodium sulfate, filtered, decolorized with charcoal, filtered and concentrated to a syrup consistency. 44 cc. of methanol were then added and the mixture was rapidly brought to the boiling point. The acetylated derivative VII crystallized out while the mixture was still hot. It was allowed to cool and permitted to stand for 2 hours. Thereafter, it was vacuum filtered and the crystals were washed with methanol and then with ether. After drying, the acetylated derivative VII was obtained with a quantitative yield. It had a melting point of 171–173° C. and a specific rotation $[\alpha]_D^{20} = -140° \pm 0.5$ (c.=1% in methylene chloride).

The product was soluble in chloroform and methylene chloride, slightly soluble in ether and insoluble in ethanol and methanol.

*Analysis.*—$C_{28}H_{34}O_4$; molecular weight 434.55. Calculated: C, 77.39%; H, 7.89%; O, 14.73%. Found: C, 77.4%; H, 8.0; O, 14.6%.

This compound is not described in the literature.

(f) *Preparation of 3β-benzoxy-17β-acetoxy-18-nor-D-homo-$\Delta^{9(11)}$-13α-androstene (VIII).*—9 gm. of Compound VII, prepared according to (e) above, were dissolved in 150 cc. of ethyl acetate and hydrogenated at atmospheric pressure and room temperature in the presence of 3 gm. of charcoal palladized with 20% palladium. The theoretical quantity of hydrogen (500 cc.) was absorbed in 50 minutes and the hydrogenation ceases on its own. The catalyst was separated by filtration and the filtrate was evaporated to dryness. The oily residue was dissolved in a minimum of methylene chloride. Methanol was added, and the mixture was heated. Crystallization began immediately. The mixture was allowed to cool and the crystals were separated by vacuum filtration. After drying, 4.35 gm. of an initial yield of Compound VIII, that is a yield of 50% of theory, were obtained. It had a melting point of 175° C. and a specific rotation $[\alpha]_D^{20} = -26.5° \pm 0.5$ (c.=1% in methylene chloride).

The product was soluble in 1 volume of chloroform and methylene chloride, slightly soluble in ether and insoluble in methanol.

*Analysis.*—$C_{28}H_{36}O_4$; molecular weight 436.57. Calculated: C, 77.03%; H, 8.31%. Found: C, 77.2%; H, 8.1%.

This product is not described in the literature.

(g) *Preparation of 3β-benzoxy-11β-hydroxy-17β-acetoxy-9α-bromo-18-nor-D-homo-13α-androstane (IX). [Bromohydrin of 3β-benzoxy-17β-acetoxy-18-nor-D-homo-$\Delta^{9(11)}$-13α-androstene].*—3.8 gm. of Compound VIII, obtained by the method described under (f) above, were dissolved in 40 cc. of dioxan, and 7.5 cc. of a 10% aqueous solution of perchloric acid and 2 gm. of N-bromo succinimide were added to the solution all at once while mechanically agitating the mixture. The solution turned reddish orange and then yellow, and finally a fine white precipitate began to form. The mixture was stirred for 30 minutes and then the excess reactive substance was destroyed with an aqueous solution of sodium sulfite until the solution was decolorized and reacted negative to starch-iodide paper. Thereafter, 75 cc. of water were added slowly, the crystalline paste was vacuum filtered, washed with water, and then triturated with ether. After vacuum filtration and drying, 3.45 gm., that is a yield of 75% of theory, of the desired Compound IX were obtained. The product recrystallized in the form of massive white prisms from ether and methylene chloride. It was soluble in chloroform and methylene chloride, slightly soluble in dioxan and insoluble in ether and water. It was unstable and had to be used immediately for the next reaction.

This compound is not described in the literature.

(h) *Preparation of 3β-benzoxy-17β-acetoxy-9α-bromo-11-keto-18-nor-D-homo-13α-androstane (X).*—3.5 gm. of the bromohydrin IX, freshly prepared by the method described under (g) above, were suspended in 300 cc. of glacial acetic acid accompanied by mechanical agitation. Without stopping the agitation, 15 cc. of a solution of chromic anhydride in acetic acid, taken from a solution prepared from 5 gm. of chromic anhydride, 5 cc. of water and 45 cc. of glacial acetic acid, were slowly introduced into the suspension. The bromohydrin IX dissolved slowly. After 4 hours of reaction at room temperature 25 cc. of methanol were added. The reaction mixture turned green. It was concentrated in a vacuum on a water bath until it had a volume of about 50 cc., whereupon water was added. The Compound X precipitated immediately. It was vacuum filtered, washed with water, again vacuum filtered and purified by trituration with ether. After drying, 2.5 gm., that is a yield of 70% of theory, of Compound X were obtained in the form of thick white needles having a melting point of 238° C. The compound was unstable, soluble in alcohol, insoluble in ether and had to be used immediately for the next step.

This product is not described in the literature.

(i) *Preparation of 3β-benzoxy-17β-acetoxy-11-keto-18-nor-D-homo-13α-androstane (XI), i.e. compound A wherein R*

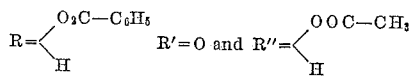

The 2.5 gm. of 9α-brominated ketone, obtained in accordance with (h) above, were dissolved in 50 cc. of glacial acetic acid by heating to 90° C. Thereafter, 2.5 gm. of zinc powder were added fairly rapidly accompanied by vigorous mechanical agitation. The mixture was stirred for about an additional ten minutes and was then allowed to cool. The zinc was filtered off on a vacuum filter, the filtrate was concentrated to about 15 cc., and Compound XI was precipitated by adding water. The product was obtained in the form of pearly platelets which were vacuum filtered and washed with water. After drying, 1.74 gm. of Compound XI were obtained in a sufficiently pure form for use in the subsequent series of reactions.

For analysis, the product was recrystallized by dissolving it in methylene chloride and adding ethyl acetate to the solution. It had a melting point of 238° C. and a specific rotation $[\alpha]_D^{20} = +18.5° \pm 0.5$ (c.=1% in methylene chloride). The product was soluble in chloroform and methylene chloride, and insoluble in water and ether. The ultraviolet spectrum shows:

$\lambda$max=229 m$\mu$, 272 m$\mu$, 280 m$\mu$
$\epsilon$ 14,820, 985, 788

*Analysis.*—$C_{28}H_{36}O_5$ molecular weight 452.57. Calculated: C, 74.30%; H, 8.02%; O, 17.68%. Found: C, 74.4%; H, 7.9%; O, 18.0%.

This compound is not described in the literature.

(j) *Preparation of 3β-benzoxy-17β-hydroxy-11-keto-18-nor-D-homo-13α-androstane (XII), i.e. compound A wherein*

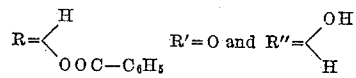

2.9 gm. of Compound XI, prepared by the method described under (i) above, were dissolved in 250 cc. of a methanol solution containing 0.75 gm. of p-toluene sulfonic acid. The solution was heated for 3 hours under reflux and then concentrated in a vacuum to a volume of about 50 cc. Water was then added, whereby Compound XII precipitated out. It was washed with water, vacuum filtered and dried. The product contained water of hydration and had a double melting point at 145° C. and 185° C. By drying it as 110° C. in vacuo, 2.46 gm. of Compound XII having a melting point of 185° C. were obtained, which represents a yield of 93% of theory.

For analysis, it was recrystallized from a mixture of benzene and cyclohexane, after which it had a melting point of 190–191° C. and a specific rotation $$[\alpha]_D^{20} = +11° \pm 1 \ (c.=0.5\% \text{ in benzene})$$

The product was soluble in benzene and methanol and insoluble in water.

*Analysis.*—$C_{26}H_{34}O_4$; molecular weight 410.53. Calculated: C, 76.06%; H, 8.34%; O, 15.59%. Found: C, 75.9%; H, 8.2%; O, 15.3%.

This compound is not described in the literature.

(k) *Preparation of 3β,17β-dihydroxy-11-keto-18-nor-D-homo-13α-androstane (XIII)*, i.e. compound A wherein

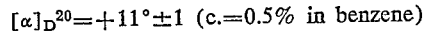

1.7 gm. of Compound XI, prepared by the method described under (i) above, were suspended in 5 cc. of a 1 N solution of sodium methylate in methanol. 5 cc. of glycol were added to the suspension, the methanol was driven off by heating to about 100° C., and the residue was then heated to 150° C. The crystals of Compound XI rapidly dissolved. After one minute of heating at 150° C., the solution was diluted with water. Compound XIII crystallized out while the solution was still hot. It was separated by vacuum filtration, washed with water and dried. The product had a melting point of 258° C. The yield was 1.2 gm.

For analysis, it was recrystallized from methyethylketone, after which it had a melting point of 261° C. and a specific rotation $[\alpha]_D^{20} = +16° \pm 1$ (c.=1% in tetrahydrofuran). The yield was 82% of theory.

*Analysis.*—$C_{19}H_{30}O_3$; molecular weight 306.43. Calculated: C, 74.47%; H, 9.87%; O, 15.66%. Found: C, 74.6%; H, 9.8%; O, 15.6%.

The same compound was obtained by saponification of compound XII under the same conditions as above.

This product is not described in the literature.

EXAMPLE II

*Preparation of 3,11,17-Triketo-18-Nor-D-Homo-13α-Androstane (XIV)* i.e. compound A wherein R, R' and R'' are =O.

This compound was prepared from Compound XIII by chromic oxidation, as follows:

350 mgm. of Compound XIII, prepared by the method described in Example I(k) above, were dissolved in 10 cc. of hot acetic acid. The solution was cooled to 15° C. and 3.5 cc. of a 10% solution of chromic anhydride in acetic acid (taken from a solution prepared from 5 gm. of chromic anhydride, 5 cc. of water and 45 cc. of acetic acid) were added, while stirring. Agitation was continued for 2¼ hours, and then 3 cc. of methanol were added, the mixture was poured into water and extracted with chloroform. The triketone XIV was extracted by the chloroform. The chloroform extract solutions were combined and washed with water, with an aqueous solution of sodium bicarbonate and again with water, dried over sodium sulfate, filtered and the filtrate was evaporated to dryness. The greenish residue was taken up in methylethylketone and the solution was concentrated by evaporation until crystallization set in. The solution was vacuum filtered and the filter cake was dried. 150 mgm. of the desired triketone XIV having a melting point of 268–270° C. and a specific rotation $[\alpha]_D^{20} = +18° \pm 1$ (c.=0.5% in methylene chloride) were obtained.

The product was soluble in chloroform and acetic acid, and insoluble in ether and water.

*Analysis.*—$C_{19}H_{26}O_3$; molecular weight 302.40. Calculated: C, 75.46%; H, 8.67%; O, 15.87%. Found: C, 75.4%; H, 8.6%; O, 15.9%.

This product is not described in the literature.

EXAMPLE III

*Preparation of 3β-Benzoxy-11,17-Diketo-18-Nor-D-Homo-13α-Androstane XVII* i.e. compound A wherein

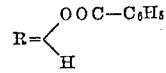

and R' and R'' are =O.

2.46 gm. of Compound XII, obtained by the method described in Example I(j) above, were dissolved in 20 cc. of acetic acid. 7.5 cc. of a 10% solution of chromic anhydride in acetic acid, prepared as indicated in Example II, were added and the mixed solution was stirred for 1¼ hours at room temperature. The diketone XVII precipitated from the reaction medium. 15 cc. of methanol were added whereupon the solution turned green. Water was added, the mixture was vacuum filtered and the filter cake was washed with water. After drying, 2.2 gm., that is a yield of 92% of theory, of Compound XVII having a melting point of 258° C. were obtained.

For analysis, the product was taken up in methylene chloride, the solution was passed through charcoal and evaporated to dryness, and the residue was recrystallized from boiling acetic acid. After vacuum filtration and drying, the product had a melting point of 264° C. and a specific rotation $[\alpha]_D^{20} = -3° \pm 1$ (c.=1% in methylene chloride).

The product was soluble in chloroform, methylene chloride and hot acetic acid, and insoluble in alcohol, ether and water.

*Analysis.*—$C_{26}H_{32}O_4$; molecular weight 408.52. Calculated: C, 76.44%; H, 7.90%. Found: C, 76.3%; H, 8.0%.

This compound is not described in the literature.

EXAMPLE IV

*Preparation of 3β,11β,17β-Trihydroxy-18-Nor-D-Homo-13α-Androstane (XVI)* i.e. compound A wherein R, R' and R'' are

1 gm. of Compound XII, prepared by the method described in Example I(j) above, were dissolved in a mixture of 5 cc. of methanol, 7 cc. of water and 10 cc. of tetrahydrofuran. The resulting solution was heated to 50° C., and then 1 gm. of potassium boron hydride was added over a period of about 15 minutes while stirring. Heating at 50° C. and stirring were continued for 2 hours more, and then acetic acid was added until the reaction medium became acid. The solution was then concentrated. Crystallization of Compound XV was initiated by scratching. The mixture was heated and vacuum filtered while hot, and the filter cake was washed with boiling water, then with cold water, vacuum filtered and dried. 3β-benzoxy-11β,17β-dihydroxy-18-nor-D-homo-13α-androstane (XV) was thus obtained. After recrystallization from ethanol and ethyl acetate, its melting point was 222° C.

This product is not described in the literature.

2.5 cc. of a 1 N solution of sodium methylate in methanol and then 2.5 cc. of glycol were added to 0.35 gm.

of Compound XV, the mixture was heated to drive off the methanol, and then heated to the vicinity of the boiling point of glycol. Solution and saponification took place in 2 minutes. The solution was cooled, water was added until crystallization was complete, and the crystals were vacuum filtered, washed and dried. The Compound XVI thus obtained was purified by dissolving it in methylethylketone and concentrating the solution until crystallization commenced. After allowing the solution to stand in the refrigerator, vacuum filtering it and drying the filter cake, 0.25 gm. of Compound XVI was obtained, that is a yield of 95% of theory. Its melting points was 260° C. ±2° C. and it had a specific rotation $$[\alpha]_D^{20} = -30° \pm 1 \ (c.=1\%, \text{ methanol})$$

The product was soluble in ethanol and methylethylketone, and insoluble in water.

*Analysis.*—$C_{19}H_{32}O_3$; molecular weight 308.45. Calculated: C, 73.98%; H, 10.46%; O, 15.56%. Found: C, 73.7%; H, 10.3%; O, 15.8%.

This product is not described in the literature.

While we have shown various examples of our invention, these were given solely for descriptive purposes, various modifications and changes may be introduced without departing from the scope of our invention. Thus, instead of blocking the hydroxyl radical in the 3-position during the operations in the form of a benzoate group, it may also be blocked in the form of another ester which is difficult to saponify, such as in the form of a naphthoate, a hexahydrobenzoate, a cyclopentylpropionate, and the like. It also can be esterified with a lower alkanoate. Likewise the 17-hydroxyl can be esterified with other acids, such as the lower alkanoic and benzoic acids. Similarly, the temperatures, the nature of the solvents and that of the oxidation reactants may be varied within the skill of the art. Finally, Compound IX may be directly debrominated and then saponified in two steps into Compound XVI, which may be then oxidized into Compound XIV in the same manner as XIII is oxidized into XIV, or XVII may be saponified and then oxidized into XIV without departing from the scope of the invention. Such changes and modifications can be made without departing from the spirit of our invention and the scope of the following claims.

We claim:

1. A process for the preparation of 3,11,17-trioxygenated-18-nor-D-homo-13α-androstanes having the structural formula

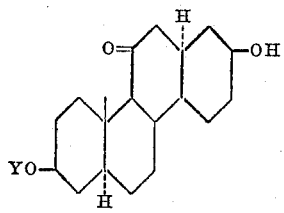

wherein Y is a difficultly saponifiable acyl group selected from the group consisting of benzoyl, naphthoyl, hexahydrobenzoyl and cyclopentylpropionyl and X represents a lower alkanoyl which comprises (*a*) reacting 3β-hydroxy-18-nor-D-homo-Δ$^{13(17a)}$-androstene-17-one with an acid chloride selected from the group consisting of benzoyl chloride, naphthoyl chloride, hexahydrobenzoyl chloride and cyclopentylpropionyl chloride, (*b*) enolizing the ester of 3β-hydroxy-18-nor-D-homo-Δ$^{13(17a)}$-androstene-17-one by reacting with a lower alkanoic acid anhydride and a lower alkanoyl chloride in the presence of a tertiary base, (*c*) brominating the 3,17-diester of 3β,17-dihydroxy-18-nor-D-homo-Δ$^{12,17a}$-androstadiene with bromine in the presence of a tertiary base and dehydrobrominating with a mixture of lithium carbonate and lithium bromide whereby the double bonds are caused to migrate from the 12,17a positions to the 11,13(17a) positions and the enol ester is saponified, (*d*) enolizing the ester of 3β-hydroxy-18-nor-D-homo-Δ$^{11,13(17a)}$-androstadiene-17-one by reacting with a lower alkanoic acid anhydride and a lower alkanoyl chloride in the presence of a tertiary base, (*e*) reducing the 3,17-diester of 3β-17-dihydroxy-18-nor-D-homo-Δ$^{9(11),12,17a(17)}$-androstatriene with a solution of an alkali metal borohydride in an inert organic solvent whereby the 17a(17) double bond is selectively hydrogenated and the 17-ester is saponified, (*f*) reacting the 3-ester of 3β-17β-dihydroxy-18-nor-D-homo-Δ$^{9(11),12}$-androstadiene with a lower alkanoic acid anhydride in the presence of a tertiary base, (*g*) reacting the 3,17-diester of 3β,17β-dihydroxy-18-nor-D-homo-Δ$^{9(11),12}$-androstadiene with hydrogen in the presence of a catalyst at room temperature and pressure whereby the 12 double bond is selectively hydrogenated, (*h*) reacting the 3,17-diester of 3β,17β-dihydroxy-18-nor-D-homo-Δ$^{9(11)}$-13α-androstene with N-bromosuccinimide to form the 9,11-bromhydrin, (*i*) reacting the 3,17-diester of 3β,17β,11β-trihydroxy-9α-bromo-18-nor-D-homo-13α-androstane with chromic acid in acetic acid, (*j*) reacting the 3,17-diester of 3β,17β-dihydroxy-9α-bromo-18-nor-D-homo-13α-androstane-11-one with zinc dissolved in acetic acid, and (*k*) recovering said 3,11,17-trioxygenated-18-nor-D-homo-13α-androstanes.

2. 3,11,17-trioxygenated-18-nor-D-homo-13α-androstanes having the structural formula

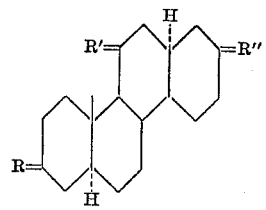

wherein R is selected from the group consisting of =O and

and Y is selected from the group consisting of hydrogen and difficultly saponifiable groups selected from the group consisting of benzoyl, naphthoyl, hexahydrobenzoyl and cyclopentylpropionyl, R′ is selected from the group consisting of =O and

and R″ is selected from the group consisting of =O and

and X is selected from the group consisting of hydrogen and lower alkanoyl groups.

3. 3β-benzoxy-17-acetoxy-18-nor-D-homo-Δ$^{12,17a}$ androstadiene.

4. 3β-benzoxy-17-acetoxy-18-nor-D-homo-Δ$^{9(11),12,17a}$ androstatriene.

5. 3β-benzoxy-17β-hydroxy-18-nor-D-homo-Δ$^{9(11),12}$-androstadiene.

6. 3β-benzoxy-17β-acetoxy-18-nor-D-homo-Δ$^{9(11),12}$-androstadiene.

7. 3β-benzoxy-17β-acetoxy-18-nor-D-homo-Δ$^{9(11)}$-13α-androstene.

8. 3β-benzoxy-17β-acetoxy-9α-bromo-11-keto-18-nor-D-homo-13α-androstane.

9. 3β-benzoxy-17β-acetoxy-11-keto-18-nor-D-homo-13α-androstane.

10. 3β-benzoxy-17β-hydroxy-11-keto-18-nor-D-homo-13α-androstane.

11. 3β,17β - dihydroxy-11-keto-18-nor-D-homo-13α-androstane.

12. 3β,11β,17β - trihydroxy-18-nor-D-homo-13α-androstane.

13. 3,11,17-triketo-18-nor-D-homo-13α-androstane.

14. 3β - benzoxy - 11,17-diketo-18-nor-D-homo-13α-androstane.

References Cited in the file of this patent
UNITED STATES PATENTS

| | | |
|---|---|---|
| 2,810,758 | Johnson et al. | Oct. 22, 1957 |
| 2,847,457 | Johnston et al. | Aug. 12, 1958 |
| 2,880,233 | Clinton | Mar. 31, 1959 |

UNITED STATES PATENT OFFICE
CERTIFICATE OF CORRECTION

Patent No. 3,024,271                  March 6, 1962

Gaston Amiard et al.

It is hereby certified that error appears in the above numbered patent requiring correction and that the said Letters Patent should read as corrected below.

Column 1, line 34, for "-13-α-" read -- -13a- --; column 5, lines 15 to 24, lower left-hand portion of formula X, for "$C_6H_4COO-$" read -- $C_6H_5COO-$ --; column 5, lines 28 to 37, formula XIII should appear as shown below instead of as in the patent:

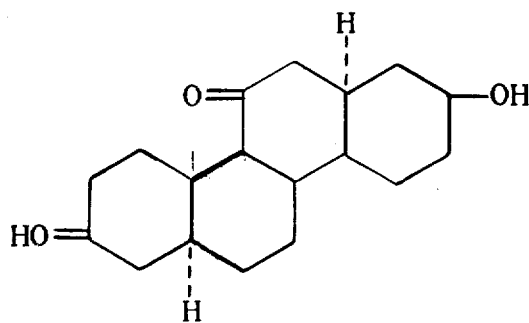

column 8, line 39, for "has" read -- had --; line 74, for "145°" read -- -145° --; column 10, line 37, strike out "R"; column 13, lines 49 to 58, upper right-hand portion of the formula, for "—OH" read -- —OX --; column 14, line 60, for "$-\Delta^{12,17a}$ an-" read -- $-\Delta^{12,17a}$-an= --; line 62, for "$-\Delta^{9(11)},12,17a$" read -- $-\Delta^{9(11)},12,17a-$ --.

Signed and sealed this 24th day of July 1962.

(SEAL)
Attest:
ERNEST W. SWIDER
Attesting Officer

DAVID L. LADD
Commissioner of Patents